Oct. 23, 1934.　　M. B. BECK ET AL　　1,977,612
STREET LIGHTING LUMINAIR
Filed July 3, 1931　　5 Sheets-Sheet 1

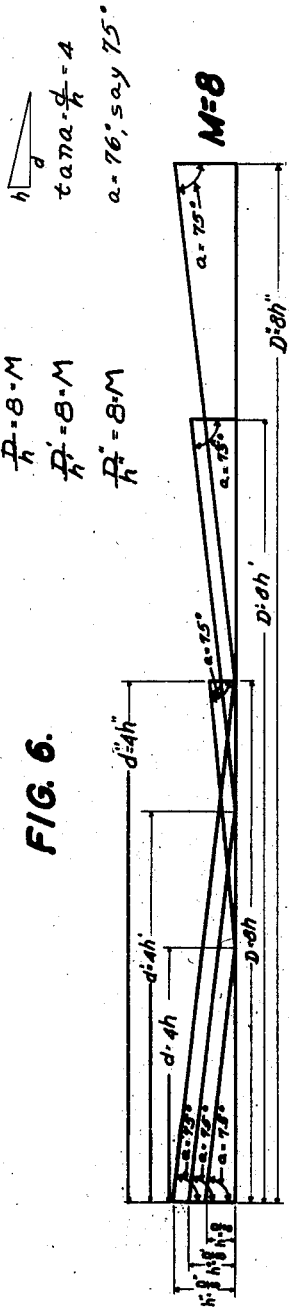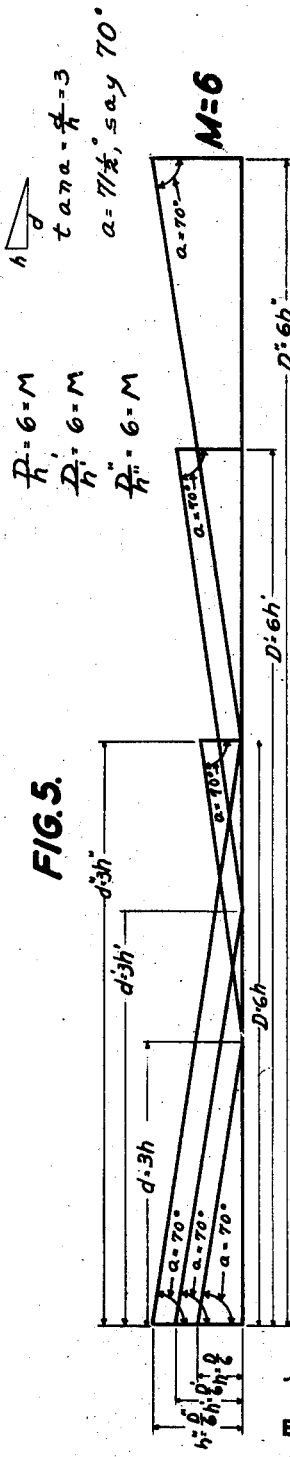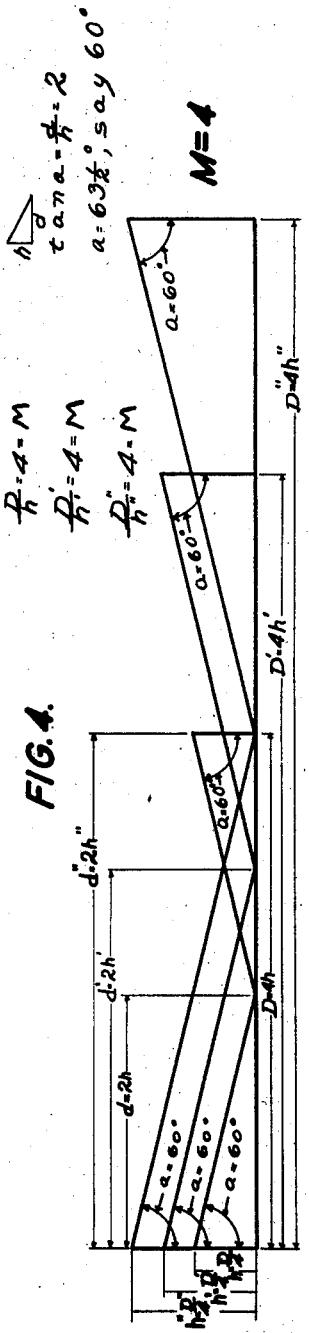

Oct. 23, 1934.  M. B. BECK ET AL  1,977,612
STREET LIGHTING LUMINAIR
Filed July 3, 1931   5 Sheets-Sheet 3

FIG. 7

STREET LIGHTING DATA.
Prototype Curve Values for Uniform Horizontal Illumination.

Formulae:

When $\alpha$ is less than $\tan^{-1}\frac{M}{2}$ .... $(cp)\alpha = K\dfrac{1+\sin\cos^{-1}\frac{\tan\alpha}{\frac{1}{2}M}}{\cos^3\alpha}$ When $\alpha$ is less than $\tan^{-1}\frac{M}{2}$ .... $(cp)\alpha = K\dfrac{1-\sin\cos^{-1}\frac{M-\tan\alpha}{\frac{1}{2}M}}{\cos^3\alpha}$

| Angle $\alpha$ | Equated to 100 c.p. at $\alpha=0$ | | | | | Equated to curve of 1000 lumens | | | | |
|---|---|---|---|---|---|---|---|---|---|---|
| | M=4 | M=6 | M=8 | M=12 | M=16 | M=4 | M=6 | M=8 | M=12 | M=16 |
| 0° | 100 | 100 | 100 | 100 | 100 | 74 | 39 | 19 | 9 | 5 |
| 5° | 101 | 101 | 101 | 101 | 101 | 74 | 40 | 19 | 9 | 5 |
| 15° | 111 | 111 | 111 | 111 | 111 | 81 | 44 | 21 | 10 | 6 |
| 25° | 133 | 134 | 134 | 135 | 135 | 98 | 52 | 25 | 12 | 7 |
| 35° | 177 | 180 | 181 | 181 | 182 | 130 | 70 | 33 | 16 | 9 |
| 45° | 264 | 275 | 278 | 281 | 282 | 195 | 108 | 52 | 25 | 14 |
| 55 | 450 | 497 | 512 | 522 | 525 | 331 | 195 | 95 | 46 | 27 |
| 60° | 600 | . | . | . | . | 442 | . | . | . | . |
| 61° | 628 | . | . | . | . | 463 | . | . | . | . |
| 62° | 648 | . | . | . | . | 477 | . | . | . | . |
| 63° | 637 | . | . | . | . | 470 | . | . | . | . |
| 64° | 462 | . | . | . | . | 340 | . | . | . | . |
| 65° | 415 | 1126 | 1222 | 1281 | 1301 | 306 | 441 | 227 | 113 | 66 |
| 67°30' | . | 1422 | . | . | . | . | 557 | . | . | . |
| 70° | 276 | 1752 | 2159 | . | . | 204 | 687 | 400 | . | . |
| 71° | . | 1813 | . | . | . | . | 710 | . | . | . |
| 72° | . | 1312 | . | . | . | . | 514 | . | . | . |
| 72°30' | . | . | 2959 | . | . | . | . | 548 | . | . |
| 74° | . | 1083 | . | . | . | . | 425 | . | . | . |
| 75° | 26 | . | 3930 | 5155 | 5445 | 19 | . | 729 | 454 | 276 |
| 75°58' | 0 | . | . | . | . | 0 | . | . | . | . |
| 76° | . | 888 | 3272 | . | . | . | 348 | 606 | . | . |
| 77°30' | . | . | . | 8180 | . | . | . | . | 721 | . |
| 78° | . | 545 | 2407 | . | . | . | 213 | 446 | . | . |
| 80° | . | . | 1784 | 12665 | 16270 | . | . | 331 | 1114 | 824 |
| 80°32' | . | 0 | . | . | . | . | 0 | . | . | . |
| 80°52' | . | . | 0 | . | . | . | . | 0 | . | . |
| 81° | . | . | . | 8895 | 21070 | . | . | . | 783 | 1066 |
| 82° | . | . | . | 7775 | 27025 | . | . | . | 685 | 1369 |
| 82°30' | . | . | . | . | 29550 | . | . | . | . | . |
| 82°52' | . | . | . | . | 26100 | . | . | . | . | 1321 |
| 83° | . | . | . | 6460 | 22400 | . | . | . | 569 | 1133 |
| 84° | . | . | . | 3940 | 18150 | . | . | . | 347 | 920 |
| 85° | . | . | . | . | 11050 | . | . | . | . | 560 |
| 85°14' | . | . | . | 0 | . | . | . | . | 0 | . |
| 86°25' | . | . | . | . | 0 | . | . | . | . | 0 |
| | K=50 | K=50 | K=50 | K=50 | K=50 | K=36.8 | K=19.6 | K=9.27 | K=4.40 | K=2.53 |

RESULTS PRODUCED BY OUR PROCESS.
RESULTS PRODUCED BY REFRACTION.

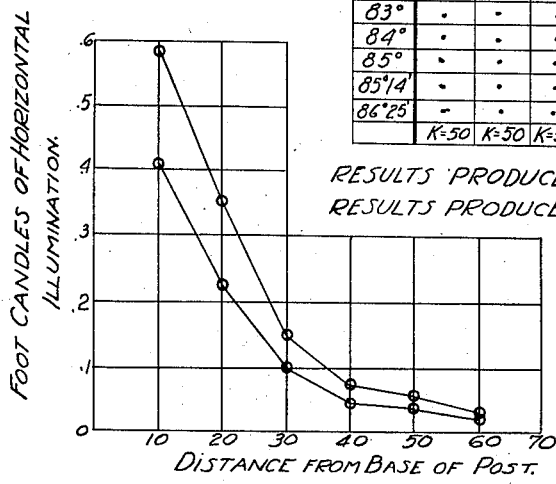

FIG. 9.

FOOT CANDLES OF HORIZONTAL ILLUMINATION
DISTANCE FROM BASE OF POST.

INVENTOR
Morris B. Beck
BY John D. Whittaker
Harry Lee Dodson
ATTORNEY

Oct. 23, 1934.　　M. B. BECK ET AL　　1,977,612
STREET LIGHTING LUMINAIR
Filed July 3, 1931　　5 Sheets-Sheet 5
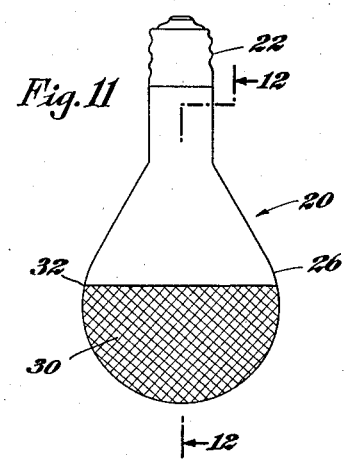
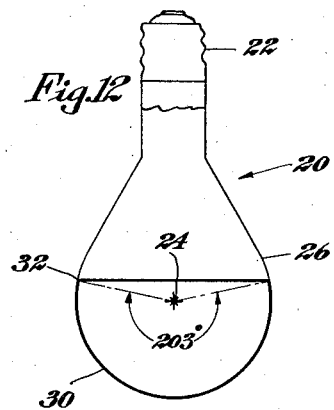
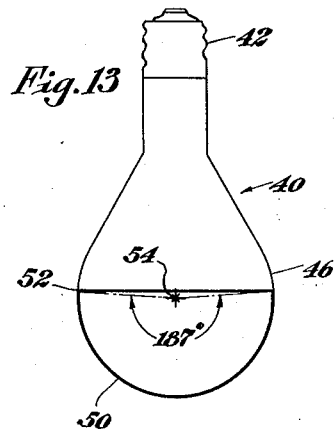
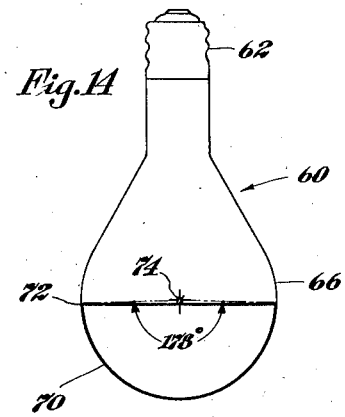
INVENTORS
Morris B. Beck,
John D. Whittaker,
BY
ATTORNEY Patented Oct. 23, 1934

1,977,612

UNITED STATES PATENT OFFICE 1,977,612

STREET LIGHTING LUMINAIR

Morris B. Beck, New York, and John D. Whittaker, Babylon, N. Y., assignors to Welsbach Street Lighting Company of America, Philadelphia, Pa., a corporation of Delaware Application July 3, 1931, Serial No. 548,524

1 Claim. (Cl. 240—25)

Our invention relates to that class of street lights which are set forth in our copending application for Street illumination, Serial No. 636,239.

In the pursuit of ideal street lighting on a scientific basis, giving due consideration to the analysis of adequate street lighting requirements in said application, it is necessary to determine the ideal light-distribution curves which are utilizable for uniform lighting on the street surfaces for given ratios of spacing distances to mounting heights. Such ideal light-distribution curves are called prototype curves.

"Prototype curves for discernment by illuminating effect will therefore be the family of curves which will produce uniform illumination under the varying conditions of spacing distance and mounting height." "Any given curve of light-distribution will give the same results as to uniformity of horizontal illumination upon the street surface, no matter what the mounting height or spacing, if the relation between these two elements is kept constant."

Uniformity,—that is, the relation of maximum to minimum illumination,—will remain constant so long as the ratio between lamp separations and mounting heights remains constant. It follows, therefore, that if the prototype light-distribution curve of uniform horizontal illumination be derived that any ratio between lamp separations and mounting heights, for such prototype curve will apply, whatever the actual separations and mounting heights, so long as the ratio of these two quantities remains constant.

This ratio has been called M. In other words $$M = \frac{\text{distance between adjacent light units}}{\text{height of light unit above street}}$$

Our invention has for its object to produce an apparatus which will constitute a concrete embodiment of the process set forth in the said application. As therein described we have set forth with great accuracy the condition constituting the problem of planned scientific street lighting before our invention was discovered. These conditions were, briefly, that it is impossible to produce the desired symmetric prototype curve which the consensus of scientific opinion of illuminating engineers holds is necessary, in order to afford the ideal type of street illumination, that is, substantially uniform, horizontal illumination on the street surface without the aid of outside accessories in addition to the outer enclosing globe and the electric light bulb.

Our invention has for its object the construction of a street lighting bulb which will produce the desired prototype curve without any accessories.

Another object of our invention is to produce a bulb suitable for use in a street lighting luminair in which there will be no parts requiring adjustment. In street luminairs designed to practically reproduce the ideal prototype light-distribution curve it is necessary to adjust these accessories and if the adjustment is improperly made the efficiency of the luminair is greatly impaired.

Our invention, as hereinafter set forth, requires no adjustment. Once it is installed it is permanent.

For the purpose of deriving the ideal light-distribution curves for uniform horizontal street illumination, we have used the well known formulæ (1) and (2), given below.

Formulæ

When $a$ is less than $$\tan^{-1}\frac{M}{2}\ \text{------}(cp)a = K\frac{1 - \sin \cos^{-1}\frac{\tan a}{\frac{1}{2}M}}{\cos^3 a}$$

When $a$ is greater than $$\tan^{-1}\frac{M}{2}\ \text{------}(cp)a = K\frac{1 - \sin \cos^{-1}\frac{M - \tan a}{\frac{1}{2}M}}{\cos^3 a}$$

It is possible for one sufficiently versed in mathematics by means of these formulæ, to ascertain by the accompanying specifications, how such curves are constructed, reference being made to the accompanying drawings.

We shall proceed to describe the process by which we are able, as demonstrated in actual street lighting practice, to accomplish the objects herein set forth.

Referring specifically to the drawings:

Fig. 4 is a diagram showing the relation of varying spacing distances to mounting heights for the values of M corresponding to Fig. 1;

Fig. 5 is a diagram showing the relation of varying spacing distances to mounting heights for the values of M corresponding to Fig. 2;

Fig. 6 is a diagram showing the relation of varying spacing distances to mounting heights for the values of M corresponding to Fig. 3;

Fig. 7 is a tabulation of prototype curve, candle-power values when various values of M are substituted in formulæ (1) and (2);

Fig. 9 is a graph showing results obtained in an actual street lighting installation, utilizing a street lighting unit, constructed in accordance with our process, in comparison with a street lighting unit constructed by an exponent of the handling of light by refraction as hereinbefore outlined;

Figure 1:
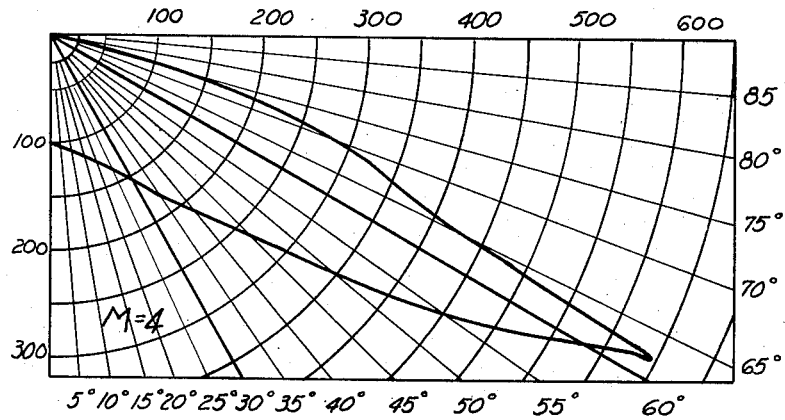
Fig. 1 is a diagram of the ideal prototype curve for street lighting where $M=4$.
Figure 2:
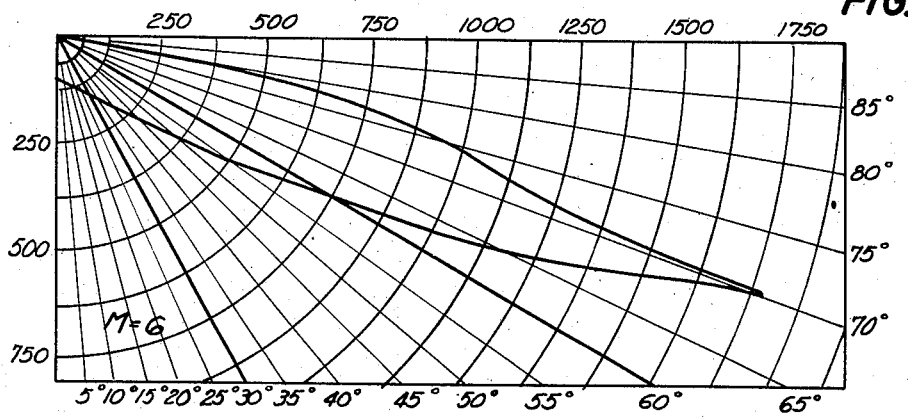
Fig. 2 is a diagram of the ideal prototype curve for street lighting where $M=6$.
Figure 3:
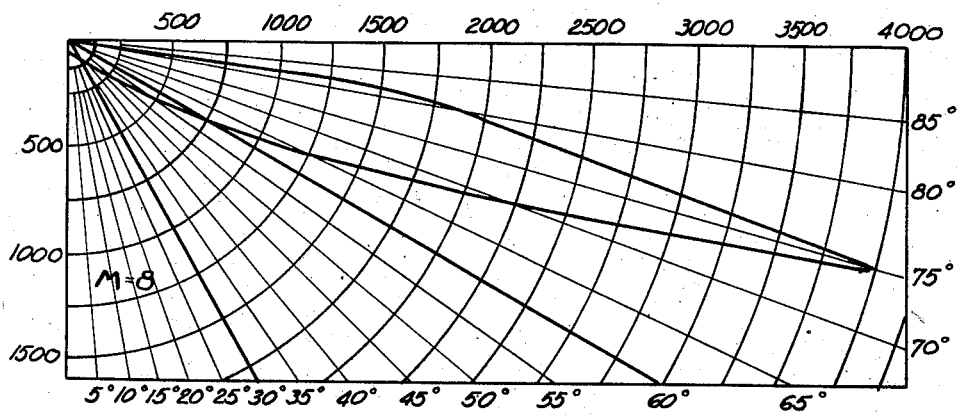
Fig. 3 is a diagram of the ideal prototype curve for street lighting where $M=8$.
Figure 8:
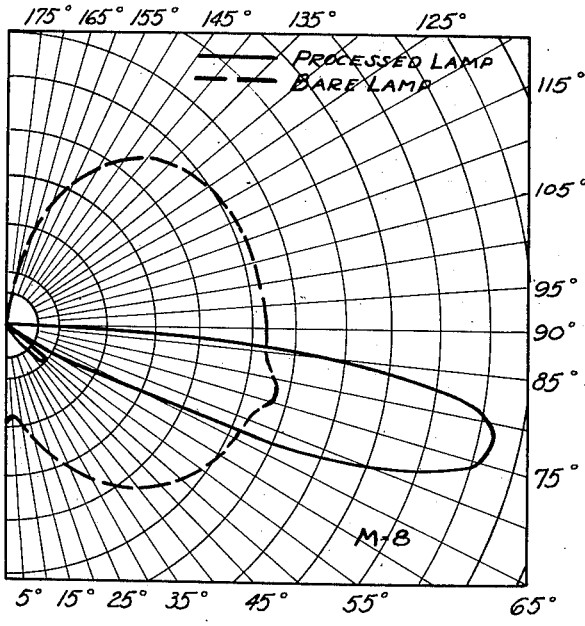
Fig. 8 is a comparison of a light-distribution curve actually attained in practice from a street lighting unit constructed in accordance with our process with the light-distribution curve, of a bare gas-filled, tungsten-filament, incandescent, series street-lamp.
Figure 10:
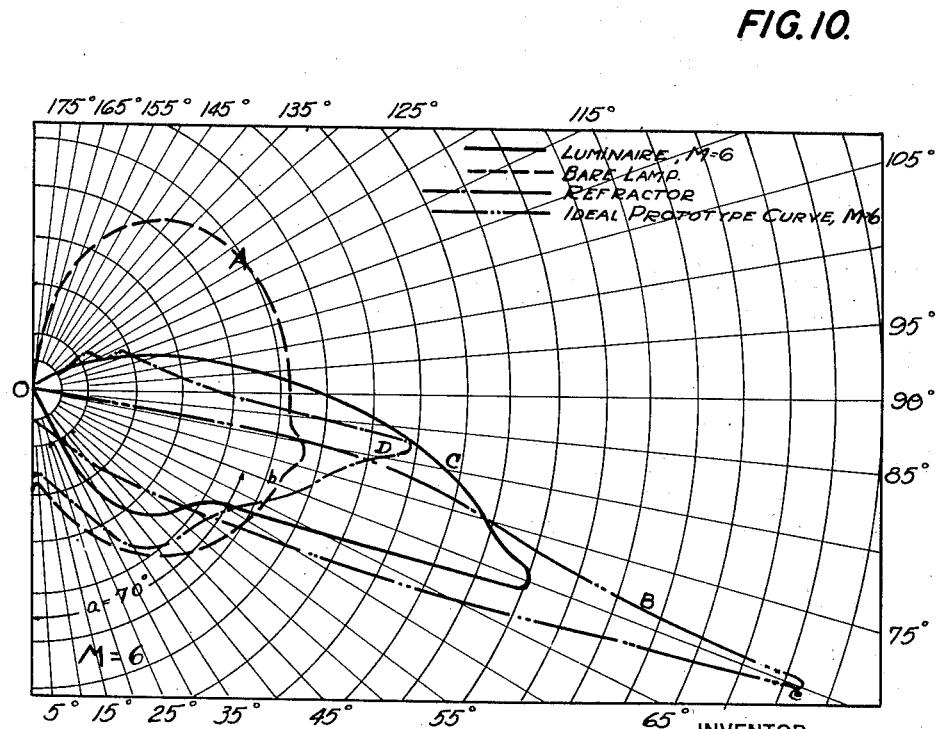

Fig. 10 is a comparison of the light distribution curves of a bare lamp, a street lighting unit constructed in accordance with our process, and the ideal prototype curve for $M=6$, together with a distribution curve from a street lighting unit actually constructed by an exponent of the handling of light by refraction as hereinbefore outlined; and Figure 11 shows a street lighting bulb, embodying one form of our invention, and intended for use where $M=4$;

Figure 12 is a sectional view of the same bulb, the angular extent of the reflecting coating being indicated;

Figure 13 is a view, similar to Figure 12, of a bulb intended for use where $M=6$; and Figure 14 is a view, similar to Figure 12, of a bulb intended for use where $M=8$.

In referring to the drawings and graphs, a series of symbols will be employed, a tabulation and description of which will now be given.

$a$=angular direction of a ray of light measured from the nadir or point directly below the lamp. This represents the Greek symbol alpha.

$cp$=candlepower of a light emitted from a street lighting unit in a direction along the angle $a$.

$K$=a constant governing the amount of flux included within the prototype curve.

$$M = \frac{\text{distance between adjacent light units}}{\text{height of light unit above street}}$$

$h, h', h''$=various heights of the street-lighting units.

$D, D', D''$=various spacing distances corresponding to the above mounting heights.

$d, d', d''$=various distances from base of post to midpoints between units.

In planning a practical street lighting system utilizing our invention, it is only necessary to follow the procedure now given in our specifications. If we assume that substantially uniform horizontal illumination is the result desired and assuming, also, the value of $M=6$, we may calculate and construct by means of the prototype curve-values given in Fig. 7 an ideal prototype curve.

Having constructed such a prototype curve of light-distribution, we now have a pattern to guide us in the design of the reflecting surface or surfaces, to be placed upon our electric light bulb and their magnitude and location, or placement. Since the light emanating from the usual forms of electric light bulbs, when in its natural state, as far as the shape of its curve of distribution is concerned, is very poorly adapted to the production of effective, practical illumination of almost any specific work space and especially for the ideal uniform horizontal illumination of the streets, boulevards, highways, and other thoroughfares, as well as airports and other large outdoor public spaces, where planned scientific illumination is desired, it is necessary to so alter and remold the natural tore, or solid of light emitted by the bare street lamp as shown in curve $a$ Fig. 10 as to reshape it into practical compliance with the shape indicated by the ideal prototype curve B in Fig. 10.

Fortunately it is within the ability of practical illuminating engineers, to accomplish this purpose by the aid of my invention, because the crude mass of light sent out by the usual form of electric light bulbs is a very plastic medium, each and every ray of it can, by such proper procedure, be easily bent by reflection and redirected into useful planes and the whole light-mass, molded into an ideal form for the solution of a given problem, such as planned scientific street lighting. It is with a structure which will produce the resultant transformation in an effective, efficient and useful manner that our invention is concerned.

In Fig. 10:

Curve A represents light-distribution from bare street-lighting lamp.

Curve B represents light-distribution from prototype curve.

Curve C represents light-distribution from a street-lighting unit constructed in accordance with our process.

Curve D represents light-distribution from a street-lighting unit equipped with prismatic refractor.

We may now proceed with the transformation of the bare-lamp curve into the prototype by determining the additive and subtractive values of candle power at all angles to reshape it for practical use.

$Ob$ from curve A (Fig. 10) =bare lamp $cp$ directed at angle $a$.

$Oc$ from curve B (Fig. 10) =required prototype $cp$ at angle $a$.

$bc$ (Fig. 10) =$cp$ required to be added to $Ob$ to produce $Oc$.

Since $Oc = Ob + bc$

Therefore $bc = Oc - Ob = cp$ required to be added to $Ob$ to produce $Oc$.

By repeating the above process for each 10 degrees, starting with 5° from the nadir, the required additive and subtractive candlepower needed at each angle can be ascertained.

Assuming that the candlepower value at the center of each 10 degree zone represents its average candlepower, the flux of light required to be added to each zone can be calculated by the aid of the following tables which gives the factors by which these candlepower values should be multiplied to give the zonal lumens or the lumens required in each 10 degree zone.

These factors are the equivalents of the actual square feet in these zones on a sphere of one-foot radius.

*Multiplying factors to obtain zone lumens from average zone candlepower*

| Zone | | Multiplying factor |
| --- | --- | --- |
| 0 to 10° | 170 to 180° | 0.095 |
| 10 to 20° | 160 to 170° | 0.283 |
| 20 to 30° | 150 to 160° | 0.463 |
| 30 to 40° | 140 to 150° | 0.628 |
| 40 to 50° | 130 to 140° | 0.774 |
| 50 to 60° | 120 to 130° | 0.897 |
| 60 to 70° | 110 to 120° | 0.992 |
| 70 to 80° | 100 to 110° | 1.058 |
| 80 to 90° | 90 to 100° | 1.091 |

When extreme accuracy, or accuracy greater than that given by the above choice of 10 degree zones and their constants is desired, zonal angles of any desired magnitude may be chosen and in like manner their constants determined and used.

The 10 degree zone chosen herein is the one made use of in all practical work of this character in illuminating engineering.

To use these factors with the curve of any lighting unit, the candlepower at 5 degrees is multiplied by the 0–10 degrees factor to obtain lumens in the 0 to 10 degrees zone; the candlepower at 15 degrees is multiplied by the 10 to 20 degree zone factor to obtain the lumens in the 10 to 20 degree zone, etc. The total lumens for any large zone is the sum of the lumens thus determined in all of the 10 degree sections of the zone.

Having thus determined the deficiencies of the bare lamp-distribution in zonal lumens for each of the 10 degrees zones as above outlined and having determined the required additive and subtractive lumens needed in each zone, we then spread a suitable specular reflective substance over such predetermined areas on the surface of the light bulbs itself to supply the already ascertained deficiencies in each zone.

A practical embodiment of our invention is illustrated in Figures 11 and 12, in which 20 indicates an incandescent bulb suitable for street lighting, having a base 22, which may be of the screw type customarily employed, an incandescent filament 24, and a glass casing or envelope of a form ordinarily used surrounding the filament, all this being the customary arrangement.

Street lighting bulbs may be mounted to burn base up or base down, and the location of the silvered surfaces must be varied accordingly. In the embodiment of Figures 11 and 12, we show a bulb intended to be burned base down, so that the reflecting coating is applied to the part of the bulb opposed to the base, being limited by the edge 32.

As has been explained heretofore, the location and extent of the reflecting coating is dependent on the value of the ratio M, and in Figures 11 and 12, is shown a bulb intended for a ratio of $M=4$. The angle subtended by the reflecting surface at the center of the filament is then 203°, as shown in Fig. 12, this value having been found to give the desired results for a value of $m=4$.

Figure 13 illustrates a bulb 40, adapted for a ratio $m=6$. This bulb has a base 42, a casing 46, a reflecting surface 50 limited by edge 52, and a filament 54. The reflecting surface subtends an angle of 187°, which figure has been found suitable in practice.

In Figure 14 is shown a bulb 60, for use where a ratio $M=8$ obtains. Casing 66 is anchored in base 62, and is provided with a reflecting surface 70, limited by edge 70, this surface subtending an angle of 178° at the center of the filament 74.

In all of the forms shown, the bulb casing has a spherical portion to which the reflecting coating is applied, and the center of the filament is shown as coincident with the center of the sphere which the spherical portion of the bulb surface forms a part. As is well known, actual filaments are of substantial extent and therefore, in referring to the filament, we indicate its location by its center, by which is meant the point which, if the filament were there concentrated, would give an effect equivalent to that of the distributed filament.

Inasmuch as the location of the center of the filament is manufactured lamps will not uniformly occupy the center position of the bulb, it is obvious that the exact position of these zones' boundaries will vary accordingly and it will be understood, on consideration of the matter that to retain the same angular spread of light, the limit of the reflecting surface must be raised the higher the location of the filament, and must be lowered, the lower the filament.

Having thus described our invention, what we desire to claim and secure by Letters Patent is:—

For use with a street lighting system for obtaing an approximation of prototype illumination on the surface of a street, in which illuminating units are mounted in uniformly spaced relation at a uniform elevation above the street surface; an incandescent electric bulb to serve as such a unit when mounted with its base lowermost, said bulb having an incandescent filament surrounded by a casing, a portion of the surface of which is of spherical contour, approximately concentric with the filament and having portions of its spherical surface opposed to its base coated with a specular reflecting medium for the purpose of redirecting a portion of the light emitted by the incandescent filament of the bulb to obtain an approximation of the distribution required for prototype illumination, the extent and location of said reflecting area varying with and being determined by the ratio of spacing distance of the units to their mounting height, the angle subtended by the lower boundary of said reflecting surface at the center of the filament, when said center is located at the geometrical center of said spherical reflecting area being approximately 187°, for a ratio of spacing distance to mounting height of 6, and the uncoated surface of the casing being clear and adapted to transmit light freely.

MORRIS B. BECK.
JOHN D. WHITTAKER.